United States Patent [19]
Mysliwiec et al.

[11] Patent Number: 4,776,045
[45] Date of Patent: Oct. 11, 1988

[54] SWIMMING GOGGLES INCLUDING A TIMING DEVICE

[75] Inventors: Jo Mysliwiec, 850 Hance Rd., Niles, Mich. 49120; Ted J. Ellis, Jr., Goshen, Ind.

[73] Assignee: Jo Mysliwiec, Niles, Mich.

[21] Appl. No.: 107,045

[22] Filed: Oct. 9, 1987

[51] Int. Cl.⁴ ............................................. A61F 9/02
[52] U.S. Cl. .......................................... 2/426; 2/428; 2/2.1 R
[58] Field of Search ................... 2/426, 427, 428, 430, 2/431, 432, 433, 434, 438, 2.1 R

[56] References Cited

U.S. PATENT DOCUMENTS

| | | |
|---|---|---|
| 1,160,741 | 11/1915 | Matalene . |
| 1,416,654 | 5/1922 | Lenneberg . |
| 3,051,957 | 9/1962 | Chan . |
| 3,210,859 | 10/1965 | Fisk et al. . |
| 3,492,582 | 1/1970 | Heywood . |
| 3,712,714 | 1/1973 | Uyeda et al. .......................... 2/428 X |
| 4,231,117 | 11/1980 | Aileo ............................................ 2/6 |
| 4,283,798 | 8/1981 | Kuehn ....................................... 2/426 |
| 4,286,439 | 9/1981 | Pasternack ......................... 2/2.1 R X |
| 4,628,418 | 12/1986 | Chabria . |

FOREIGN PATENT DOCUMENTS 1140099  2/1962  Fed. Rep. of Germany .

Primary Examiner—Louis K. Rimrodt
Assistant Examiner—J. L. Olds
Attorney, Agent, or Firm—Barnes & Thornburg

[57] ABSTRACT

A pair of swim goggles is provided which incorporates a timing device with a visual display in the swimmer's field of vision and automatic actuation upon contact with water. A lens allows the wearer to read the display located near the eye. A preferred embodiment incorporates this lens into the corner contour of the eye shield. Other embodiments provide the lens, timing device, display, power and related circuitry in a module insertable in an opening in one eye covering. The timing device can assist a swimmer in pacing and measuring elapsed time, in both recreational and competitive swimming.

25 Claims, 1 Drawing Sheet

U.S. Patent
Oct. 11, 1988
4,776,045
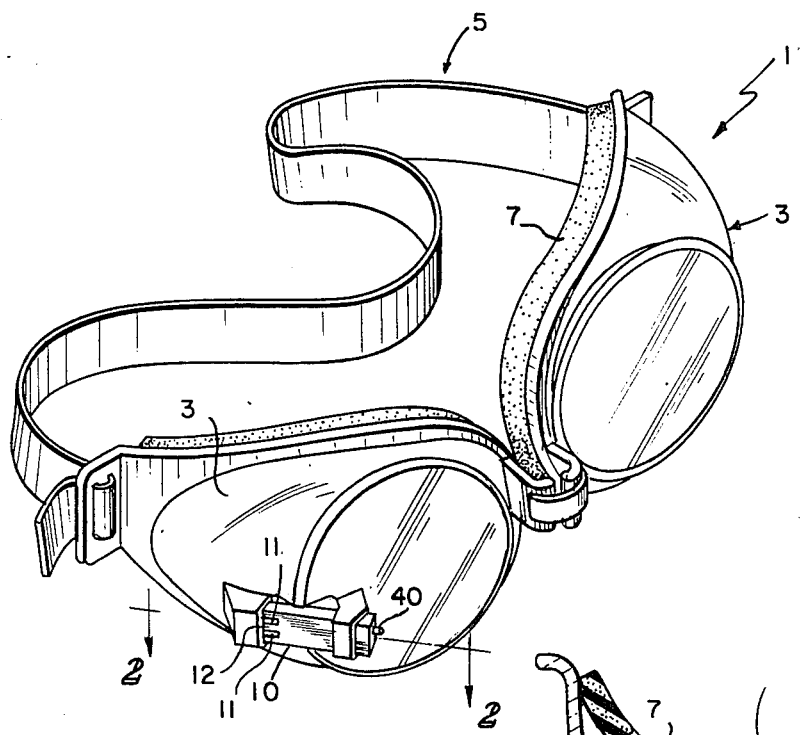
*FIG. 1*
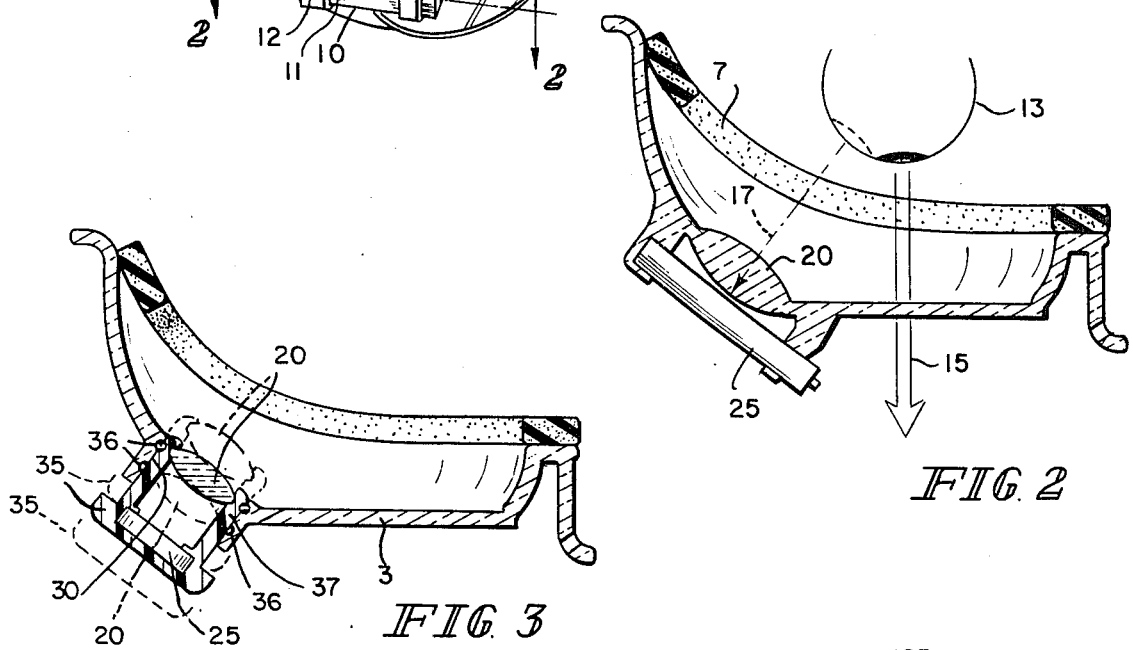
*FIG. 2*
*FIG. 3*
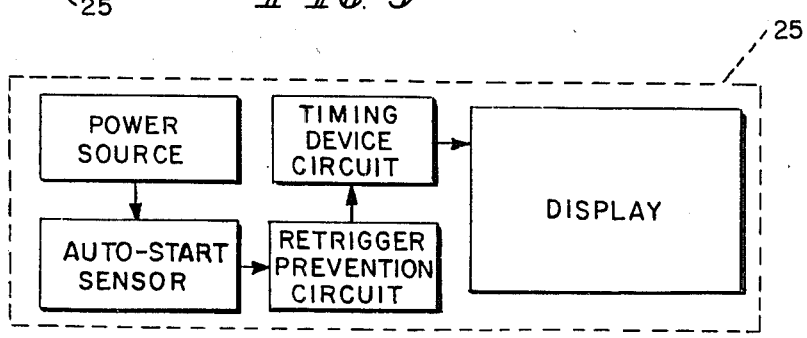
*FIG. 4*

SWIMMING GOGGLES INCLUDING A TIMING DEVICE

BACKGROUND AND SUMMARY OF THE INVENTION

The present invention is generally related to goggles, particularly goggles used by swimmers. A timing device is incorporated into the eye covering area of the goggles. Specifically, the present invention incorporates a replaceable or permanently mounted electronic timing device with a visual display and automatic actuation into a pair of swim goggles. The visual display is located out of the swimmer's usual line of sight, but in the swimmer's field of vision.

It is desirable to provide remotely controlled devices for indicating to a swimmer his pace, time elapsed, and goal accomplishment. Many pacing devices require permanent installation of a visual display at the pool and communicate the same pacing information to all swimmers in the pool. A disadvantage of these pacing devices is that the swimmer has to look towards the signaling apparatus to determine his proper pace. This can be a distraction, thereby hindering the swimmer's performance. Further, with the number of different swimming strokes, the placement of the signal devices must be placed at numerous locations. The swimmer may also have problems focusing on the signaling devices because of the splashing water.

Audible pacing devices have also been used in various forms, the simplest being an individual calling time to a particular swimmer. One problem with this method is that each swimmer needs an individual to announce his time. Another problem is having individuals at swimming events and early morning practice sessions. Additionally, the information can be difficult to hear among the confusion and distractions of the event.

Loudspeakers can also be used to announce specific intervals of time. However, each swimmer may not reach a specific location at the interval of time when the loudspeaker announces the time. Further, this method is not always available during practice sessions.

U.S. Pat. No. 3,492,582 discloses a method controlling the rhythm in the pace of a runner or the stroke of a swimmer by communicating information to the runner (or swimmer) by a timed, audible signal. This device allows a coach to control the frequency of the timed audible signal. In swimming events, a waterproof encapsulated signal-deriving device is provided on a headframe which is carried by the swimmer. However, swimmers desire to reduce their weight and drag characteristics to a minimum. The additional headframe and audible device in the ear would detract from these desired characteristics.

U.S. Pat. No. 4,231,117 discloses a helmet assembly with a portable display unit in a predetermined position relative to the eye of the wearer. This reference discloses the general idea of holding a visual display unit in a predetermined position relative to the eye of the wearer. However, few swimmers would desire to wear this bulky helmet or any unnecessary headgear in swimming events.

U.S. Pat. Nos. 4,286,439 and 4,283,798 and German Pat. No. 1,140,099 disclose face masks for divers which include interior timing and directional instruments. These masks would be burdensome in swimming events since they would add unnecessary weight and drag. Swimmers ordinarily wear lightweight compact goggles.

U.S. Pat. No. 3,712,714 discloses an information display for a diver's face mask. A diver's status indicators, such as a clock, compass, air pressure gauge, or the like, are located out of the diver's usual line of sight but encompassed by the diver's field of vision. In order to read the indicators, a pair of mirrors is provided. The mirrors allow the status indicators to be attached to an upper portion of the face mask. The mirrors provide reflecting surfaces enabling the diver to view the reflected image of the indicators.

Light-emitting diodes, or LEDs, are secured to glasses in U.S. Pat. No. 4,283,127. However, these lights are used to create a jovial entertaining effect rather than to provide information related to pacing a swimmer.

Finally, digital display of time in compact modules is also known in the art. For example, a digital clock is provided in the multi-purpose miniature flashlight device disclosed in U.S. Pat. No. 4,628,418.

The above-described references do not teach to provide timing devices mounted on goggles with a timing device actuated by contact with water, a condition common to all swimming events. The references do not teach or disclose incorporating a lens directly into the eye shield of swim goggles. The references also do not suggest providing an opening in the eye shield to allow insertion of a timing/lens module adjustable to the particular wearer's eyesight. The references do not disclose timing devices on compact light-weight swim goggles.

It is an object of the present invention to provide an improved pair of swim goggles.

It is a further object of the present invention to provide swim goggles with a timing device incorporated therein.

It is another object of the present invention to provide a timing device actuated by water.

The following are still further objects of the present invention:

(1) to provide a compact timing device attachable to drag-resistant, compact and light-weight swim goggles;

(2) to provide swim goggles with a timing device for pacing of swimmers and measuring elapsed time during training and in competition;

(3) to provide a timing device attached directly to goggles out of the usual line of vision of the swimmer;

(4) to provide swim goggles with a lens integrally formed in the eye shield;

(5) to provide a swim goggle having a modular lens and timing device insertable into an opening of the swim goggle;

(6) to provide a swim goggle with a water-actuated starting means with retriggering means allowing a swimmer to measure elapsed time while his head moves in and out of the water;

(7) to provide a modular timing/lens combination which is relatively adjustable to an individual's eyesight;

(8) to provide a relatively inexpensive eye goggle having a timer mounted therein;

(9) to provide means for reading a timing display located relatively close to the eye;

(10) to provide means for displaying time to a swimmer; and

(11) to provide visual means to signal to a swimmer periods of elapsed time.

These and other objects of the present invention are attained by swim goggles which incorporate a replaceable and/or permanently mounted electronic timer with a visual display. An optical lens, provided either integrally in the molded eye shield or as a separate lens, creates a "virtual image" of the display at a distance in which the eye can focus. The timing device can be actuated by contact with water. All of the above objects are exemplary of the purposes, objects and important features of the invention. Other objects and purposes will become apparent to those skilled in the art from the specification which follows and from the drawings to which reference is made.

BRIEF DESCRIPTION OF THE DRAWINGS

FIG. 1 is a perspective view of a pair of swim goggles with the timing device attached at a corner portion of eye covering.

FIG. 2 is a top sectional view of of FIG. 1 at section 2—2 showing the convex lens integrally formed in a portion of the eye shield and a timing device attached outwardly from the lens.

FIG. 3 is a top sectional view of a preferred embodiment showing the lens and timing device combined into a component which is insertable into an opening in the eye shield.

FIG. 4 is a schematic block diagram of the timing device employed in the swim goggles.

DESCRIPTION OF THE PREFERRED EMBODIMENTS

Reference is made to FIG. 1 for an understanding of the overall concept of the invention. Swimming goggles 1 are used by swimmers to keep water from the participant's eyes. Goggles 1 include two protective eye coverings or shields 3 held about a swimmer's eyes by an elastic strap 5. A foam seal 7 is provided between the protective eye covering 3 and the wearer's face. A module 10 is attached to one of the eye coverings 3 out of the usual line of sight of the wearer, yet in the wearer's field of vision. This module 10 includes a timing device with a visual display. A lens 20 can be incorporated into either the module 10 or the eye shield 3. The module 10 could be attached to many other styles of goggles.

FIG. 2 shows a wearer's eye 13 in spacial relationship to the goggles. The usual line of sight is designated by arrow 15, while arrow 17 designates a line of sight in the wearer's field of vision.

A double convex lens 20 is used to create a "virtual image" of the visual display of the timing device which makes the display of the module appear at the "near point" or beyond the near point. The average human eye "near point" is the closest point an object can be placed to the eye while remaining in focus. The average near point for an adult human is 10 inches. The optical magnification system or lens 20 is located between the eye and the display of the electronic timing device 25. The lens creates a readable display image even though the display numerals are only approximately 1½ inches from the swimmer's eye.

The lens 20 can be used to magnify the digital display in order to use a very small display. Magnification optics, if necessary, can be incorporated into the lens.

In the preferred embodiment shown in FIG. 2, the convex lens 20 is integrally formed in the protective eye covering 3 of the goggle 1. This provides distinctive advantages, such as eliminating the need for a water seal around the timing device 25. In this embodiment, timing device 25 can be attached to an existing pair of goggles designed for use with a timing device. This allows the goggles to be used with or without the timing device.

Lens 20 is located at a natural contour on the outside corner of the goggles. The integrally formed lens can be incorporated into this portion of the goggles without detracting substantially from the shape of the goggles.

A digital numeral display of elapsed time is preferred in particular embodiments. In combination with digital numerals, color-coded flashes of light can provide pacing and timing information. For example, each time a flash of red light is emitted, the swimmer should have his right arm in the water. Or, at a flash of blue light, the swimmer should be at a predetermined location. Alternatively, red flashes could be at 15-second intervals and blue flashes at 30-second intervals.

Numerous other displays are also possible. The digital timer is one of many readily available timing products which is waterproof. Without using a waterproof timer, the proposed device would have little value.

FIG. 3 shows another preferred embodiment of the present invention in which an opening 30 is provided in the eye goggles. A module 35 is then inserted into the opening 30 in the eye covering 3. This module includes holder unit 37, timing device 25, and lens 20. A watertight seal is provided between opening 30 and module 35 by O-rings 36. The module 35 is adjustable by pushing or pulling the unit in or out of the opening to focus the image. Digital readout means can sometimes be seen better by slight tilting or moving a particular distance away from the eye to eliminate shadows. The embodiment illustrated in FIG. 3 allows these types of adjustments. The module should only be adjusted to a safe distance from the wearer's eye.

Various other types of sealing could be used or the device could also be fixedly attached by the use of a glue. The sealing could be in the securing by glue after the lens is adjusted to a particular wearer's eyesight.

FIG. 4 is a block diagram showing a power source connected with an autostart sensor connected with a retrigger prevention circuit connected with a timing device circuit connected with a visual display. The water conductivity sensor with associated electronic circuitry triggers the timing device into operation at the instant the sensor on the goggles enters the water. Retriggering circuitry prevents further resetting and retriggering of the timing device as the swimmer's face moves the goggles out and then back into the water.

The water-actuated sensor can be two exposed metal contacts 11 which are physically separated by an insulator 12. The sensor can be incorporated on the surface of the timing module. The retrigger-prevention circuitry is relatively compact and could be incorporated into the module. The entire timing device could be integrated into a compact module for attachment to the goggles. A power source may either be compact enough to be made part of the module itself or may be attached to the goggle headstrap, with flexible insulated wires carrying power to the module. The components for the electronic circuit are all readily available at an electronics distribution outlet.

Using a conductivity-type water sensor results in a delay from the starter's signal until entry into the water. However, there is usually very little variation in this delay period from swimming event to swimming event. The delay period could be experimentally measured and then designed into the beginning valve of the display. For instance, if the delay was measured to be 0.75 seconds, this circuitry would cause the timing device display to start at 0.75 when the swimmer enters the water.

The timing device is stopped manually in particular embodiments. For example, a manual stop button 40 (FIG. 1) can be pushed to stop the timing device. precise stopping of the timing device is not a factor in pacing a swimmer during a competitive and/or pleasure swimming. Official times will be posted at the end of the race for all swimmers to read.

Manual starting means have also been contemplated for use in versions of the goggles (not shown in the drawings). Various actuation means common to swimming are also contemplated such as response to buzzers or guns. These actuation means are presently in developmental and experimental stages.

Automatic actuation timing devices in goggles can be used for other race environments. For example, many motorcycle racing participants wear goggles and are concerned about pacing themselves through a particular course. Obviously, the autostart device would not be associated with water. Snowmobile racers could also benefit from this type of goggle. Track and field events could also utilize embodiments of these goggles. These are only exemplary of the many contemplated uses.

The electronic timing means is readily available from a number of sources. The digital readout is also a known commodity. However, the combination of a lens with a visual timing display in a swim goggle with an actuation means common to swimming is considered a novel device.

Although the present invention has been described in detail, the same is by way of illustration and example only and is not to be taken by way of limitation. The spirit and scope of the present invention are to be limited only by the terms of the appended claims.

What is claimed is:

1. A pair of goggles for use by a swimmer comprising:
   an eye covering;
   visual display means for indicating elapsed time mounted on said eye covering in the swimmer's field of vision out of the swimmer's usual line of sight;
   a lens means for creating a readable image of said display means; and
   an autostart means for actuating said visual display means in response to environmental conditions common to swimming.

2. The goggles of claim 1 wherein said autostart means is actuated by contact with water.

3. The goggles of claim 2 wherein said visual display means includes a timing device incorporated as a modular unit.

4. The goggles of claim 2 wherein said autostart means and said visual display means are incorporated into a timing module including a retrigger prevention means for continued operation and a power source for said timing module.

5. The goggles of claim 1 wherein said autostart means includes a conductivity-type sensor, associated electronic circuitry, a retrigger prevention means allowing the timing device to continue operation when the swimmer's head comes out of the water, and power means for the display.

6. The goggles of claim 1 wherein said lens means includes a lens which creates a virtual image of said display means, making said display means appear to be at wearer's near point or beyond the near point.

7. The goggles of claim 6 wherein said lens means is integrally formed in said eye shield.

8. The goggles of claim 7 wherein said visual display means is detachable from said goggles.

9. The goggles of claim 7 wherein said autostart means includes a plurality of metal contacts separated by an insulator and started upon contact with water.

10. The goggles of claim 9 wherein said autostart device is incorporated on a surface of said timing module.

11. The goggles of claim 10 wherein a power source is made as part of said visual display means.

12. The goggles of claim 10 wherein a power source is attached to said goggles distant from said eye shield.

13. Swim goggles comprising:
    an eye covering;
    a timing means for measuring elapsed time combined with a lens as a module;
    said eye covering including an opening in said eye covering out of wearer's usual line of sight, in wearer's field of vision; and
    said module constructed to be insertable into said opening and including sealing means about said module for preventing water from entering the goggles.

14. The goggles of claim 13 wherein said module includes:
    a display means for displaying elapsed time;
    a lens means for assistance in reading said display means; and
    an actuation means for starting said timing means.

15. The goggles of claim 14 wherein said actuation means is activated by contact with water.

16. The goggles of claim 13 wherein said module is adjustable for variations in the swimmer's eye capabilities.

17. The goggles of claim 15 wherein a retrigger prevention circuit allows the timing device to continue to operate when the actuation means moves out of the water.

18. The goggles of claim 15 wherein said module is mounted at an outside corner of the eye covering of the goggles.

19. Swim goggles used to keep water away from a swimmer's eyes comprising:
    an eye shield;
    a display means with digital numerals located near said lens;
    an optic lens means for creating a virtual image of said display means at the wearer's "near point" or beyond the near point;
    a timing device for sending elapsed time readings for display on said display means; and
    a water-actuated starting means for actuating said timing device upon contact with water.

20. The goggles of claim 19 wherein said display means includes flash means for sending color-coded signals at predetermined periods to assist a swimmer in pacing.

21. The swim goggles of claim 19 wherein said goggles include:
    two individual eye shields;
    a connecting strap across the nose;
    a sealing means between a wearer's face and the eye shields; and
    a securing means to hold said goggles on the wearer's face.

22. A timing device attachable to swimming goggles comprising:
- a time measuring means for measuring time intervals;
- a visual display means for displaying time within wearer's field of vision;
- an optical lens means for assistance in reading said display means; and
- an autostart device for said timing device, including a sensor for activating said time-measuring means which detects environmental conditions common to swimming events.

23. The timing device of claim 22 wherein said time-measuring means, visual display means, optical lens means, and autostart device are encompassed in a modular unit.

24. The timing device according to claim 22 wherein said sensor of said autostart device is activated by contact with water.

25. A pair of goggles for use in competitive or recreational events comprising:
- an eye shield;
- a visual display means for indicating elapsed time mounted on said goggles in a wearer's field of vision and out of the wearer's usual line of sight;
- an optical lens means for assisting reading said display means; and
- a starting means for actuating said timing device by external stimulation.

* * * * *